United States Patent [19]

Ichikawa

[11] Patent Number: 5,144,364
[45] Date of Patent: Sep. 1, 1992

[54] POWER SUPPLY FOR ELECTROPHOTOGRAPHY APPARATUS

[75] Inventor: Toshiyuki Ichikawa, Numazu, Japan

[73] Assignee: Tokyo Electric Co., Ltd., Tokyo, Japan

[21] Appl. No.: 669,384

[22] Filed: Mar. 14, 1991

[30] Foreign Application Priority Data

Mar. 22, 1990 [JP] Japan .................................. 2-72828
Mar. 22, 1990 [JP] Japan .................................. 2-72830

[51] Int. Cl.⁵ .............................................. G03B 27/72
[52] U.S. Cl. ........................................ 355/69; 363/89
[58] Field of Search ................... 355/69, 77; 363/63, 363/89

[56] References Cited

U.S. PATENT DOCUMENTS

| | | | |
|---|---|---|---|
| 4,234,249 | 11/1980 | Weikel, Jr. et al. | 363/89 X |
| 4,239,373 | 12/1980 | Weikel, Jr. et al. | 363/89 X |
| 4,320,447 | 3/1982 | Krauss | 363/63 |
| 4,535,341 | 8/1975 | Kun et al. | 346/107 R |
| 4,855,648 | 8/1989 | Yagasaki | 355/69 X |

OTHER PUBLICATIONS

Modern Electronic Circuits Reference Manual, copyright McGraw-Hill, Inc.

Primary Examiner—L. T. Hix
Assistant Examiner—D. Rutledge
Attorney, Agent, or Firm—Frishauf, Holtz, Goodman & Woodward

[57] ABSTRACT

A power supply device includes a first output circuit for outputting a power supply voltage of a first potential, a second output circuit for outputting a power supply voltage of a second potential, a circuit for connecting the first and second output circuits, a circuit for applying a predetermined central potential to the connecting circuit, a circuit for generating a reference potential having a predetermined potential difference from the central potential, a circuit for generating a first detection potential corresponding to the first potential, a circuit for generating a second detection potential corresponding to both the first potential and the second potential, a circuit for controlling the first output circuit to minimize a potential difference between the first detection potential and the reference potential, a circuit for controlling the second output circuit to minimize a potential difference between the second detection potential and the central potential, and a circuit for forcibly changing at least one of the first detection potential and the reference potential using a predetermined control signal, so that both the first potential and the second potential change toward the central potential.

4 Claims, 5 Drawing Sheets

POWER SUPPLY FOR ELECTROPHOTOGRAPHY APPARATUS

BACKGROUND OF THE INVENTION

1. Field of the Invention

The present invention relates to an improvement in a power supply device used as a power supply for driving a common driver of a line head having, e.g., an array of a large number of electroluminescence elements.

2. Description of the Related Art

A printer called an electroluminescence (to be abbreviated as EL hereinafter) printer performs information recording on a photosensitive drum using a line head having an array of a large number of EL elements. More specifically, after the surface of a photosensitive drum whose surface is formed of a photoconductive material is uniformly changed, the surface is exposed with light emitted from the EL elements, thereby recording image information in the form of an electrostatic latent image. The electrostatic latent image is developed with a toner to form a toner image. The toner image is transferred to a paper sheet. In this manner, a printing operation is performed.

Each EL element used in such an EL printer comprises a channel electrode and a common electrode. The channel electrode is applied with a rectangular wave voltage having a voltage amplitude of $+28$ V, and the common electrode is applied with an AC voltage pulse which is periodically changed from, for example, $+260$ V $\rightarrow +15$ V $\rightarrow -230$ V $\rightarrow +15$ V $\rightarrow +260$ V, and has relatively high voltage values, thereby performing a light-emitting operation.

The AC voltage applied to the common electrode is generated by a common driver. The common driver is externally applied with voltages of $+260$ V, $+15$ V, and $-230$ V.

In this power supply device, however, relatively high voltages of 260 V and $-230$ V cannot be stopped unless external power supply is cut off. For this reason, when, for example, a paper jam occurs in a printing operation, the high voltages alone cannot be selectively stopped while the power supply is kept ON.

For example, when a paper jam occurs, a housing is opened, and the jamming paper is removed. In this case, since a high voltage generator is dangerous, the high voltages ($+260$ V, $-230$ V) must be stopped. In this case, in the conventional device, since the external power supply itself is cut off, if a printer employs a thermal fixing device, the fixing device is undesirably cooled.

SUMMARY OF THE INVENTION

It is, therefore, an object of the present invention to provide a power supply device for an electrophotography apparatus, which device can easily stop only outputs of relatively high positive and negative voltages under external control.

In order to achieve the above object, a power supply device according to the present invention comprises: a first output circuit for outputting a power supply voltage of a first potential; a second output circuit for outputting a power supply voltage of a second potential; a connection circuit for connecting the first and second output circuits; a circuit for applying a predetermined central potential to the connection circuit; a reference potential circuit for generating a reference potential having a predetermined potential difference from the central potential; a first detection potential circuit for generating a first detection potential corresponding to the first potential; a second detection potential circuit for generating a second detection potential corresponding to both the first potential and the second potential; a first control circuit for controlling the first output circuit to minimize a potential difference between the first detection potential and the reference potential; a second control circuit for controlling the second output circuit to minimize a potential difference between the second detection potential and the central potential; and a circuit for forcibly changing at least one of the first detection potential and the reference potential using a predetermined control signal, so that both the first potential and the second potential change toward the central potential.

In the above arrangement, for example, the first and second output circuits are used to power positive and negative high voltage sections of an electronic copying machine. If the control signal is generated when a cover of the copying machine is opened, only positive and negative power supply potentials to the positive and negative high voltage sections can be attenuated to the central potential at the same rate. If the central potential is sufficiently lower than the potentials to be supplied to the high voltage sections, power supply to the high voltage sections can be equivalently stopped.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will be described below with reference to the accompanying drawings. In this embodiment, the present invention is applied to a power supply for driving a common driver in a line head having an array of a large number of EL elements, which is used as an exposure device in an EL printer.

Figure 1:
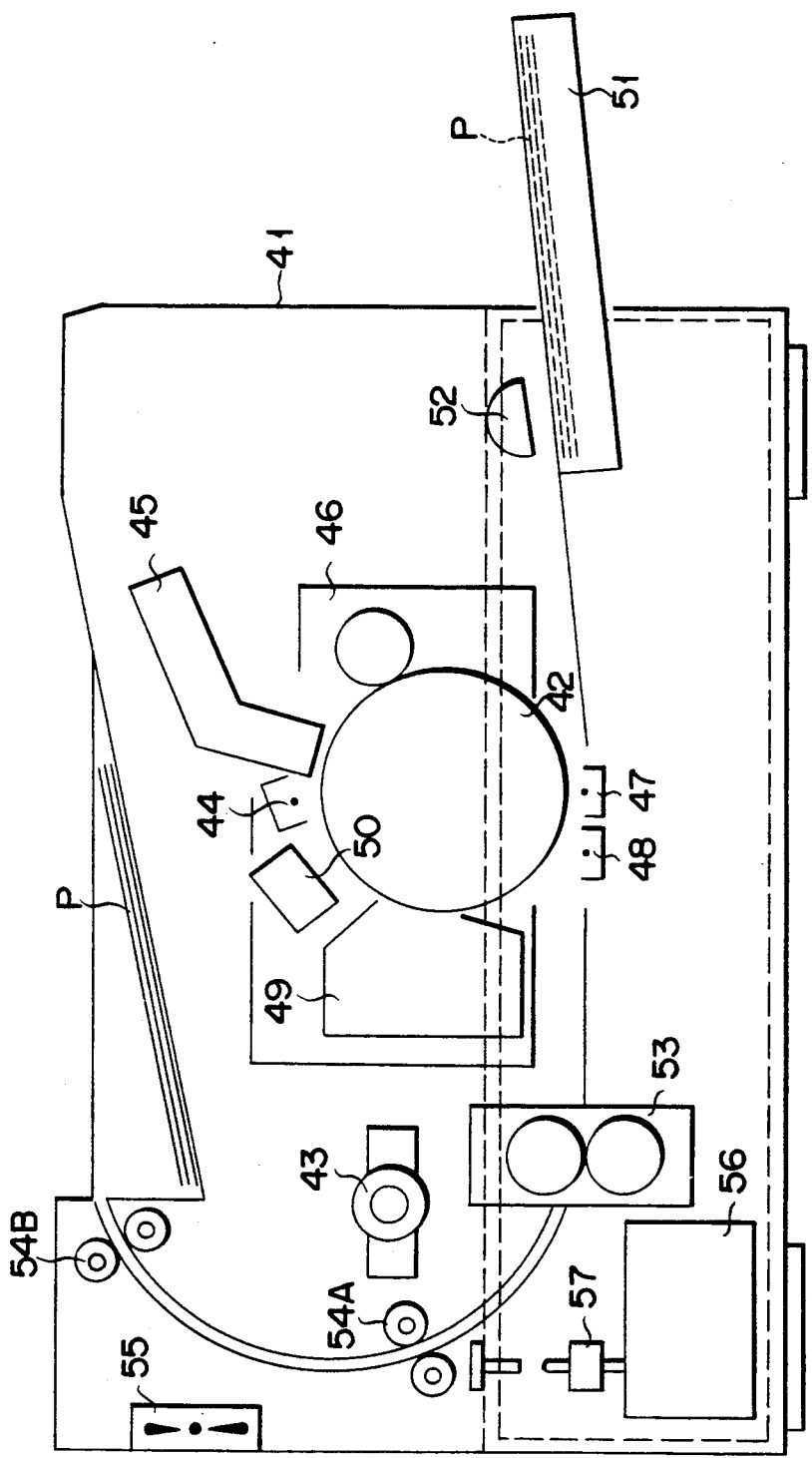
FIG. 1 is a sectional view showing a structure of an EL printer.

FIG. 1 shows a structure of an EL printer. Photosensitive drum 42 whose surface is formed of a photoconductive material is arranged in substantially the central portion of housing 41 which is axially supported at one end, so that a portion at the other end can be vertically opened. Photosensitive drum 42 is rotated by drive motor 43 in one direction, i.e., in the clockwise direction in FIG. 1. Arranged around photosensitive drum 42, in accordance with a known electrophotography process, are charger 44 for charging the photosensitive body on the surface of photosensitive drum 42; EEH (edge emitter array head) unit 45 for radiating light onto the photosensitive body charged by charger 44 to expose and record information thereon, thus forming an electrostatic latent image, developer 46 for developing the electrostatic latent image formed under the exposure control of EEH unit 45 with a toner as a developing agent; transfer charger 47 for transferring the toner image from photosensitive drum 42 onto conveyed paper sheet P; discharger 48 for discharging the residual charge on paper sheet P; cleaning device 49 for removing the residual toner on photosensitive drum 43; and discharging device 50 for discharging photosensitive drum 42 to prepare for the next charging operation.

EEH unit 45 comprises a line head including an array of a large number of EL elements, i.e., an edge emitter array head (EEH).

Transfer charger 47 is located below photosensitive drum 42. Paper sheets P are fed one by one at a predetermined timing from paper feed cassette 51 arranged at the other end side of housing 41 toward transfer charger 47 upon operation of pickup roller 52.

After the toner image on photosensitive drum 42 is transferred onto fed paper sheet P by transfer charger 47 and fixed by fixing device 53, paper sheet P is then exhausted onto an upper portion of the housing by exhaust rollers 54A and 54B.

Drive motor 43 serves as a driving source of a convey mechanism for paper sheets P as well as a driving source of photosensitive drum 42.

Fan motor 55 for dissipating internal heat outside the printer, DC power supply device 56, cover-open switch 57 for detecting a vertically opened state of housing 41, and cutting off a 24-V power supply output line from DC power supply device 56, and the like are arranged in housing 41.

Figure 2:
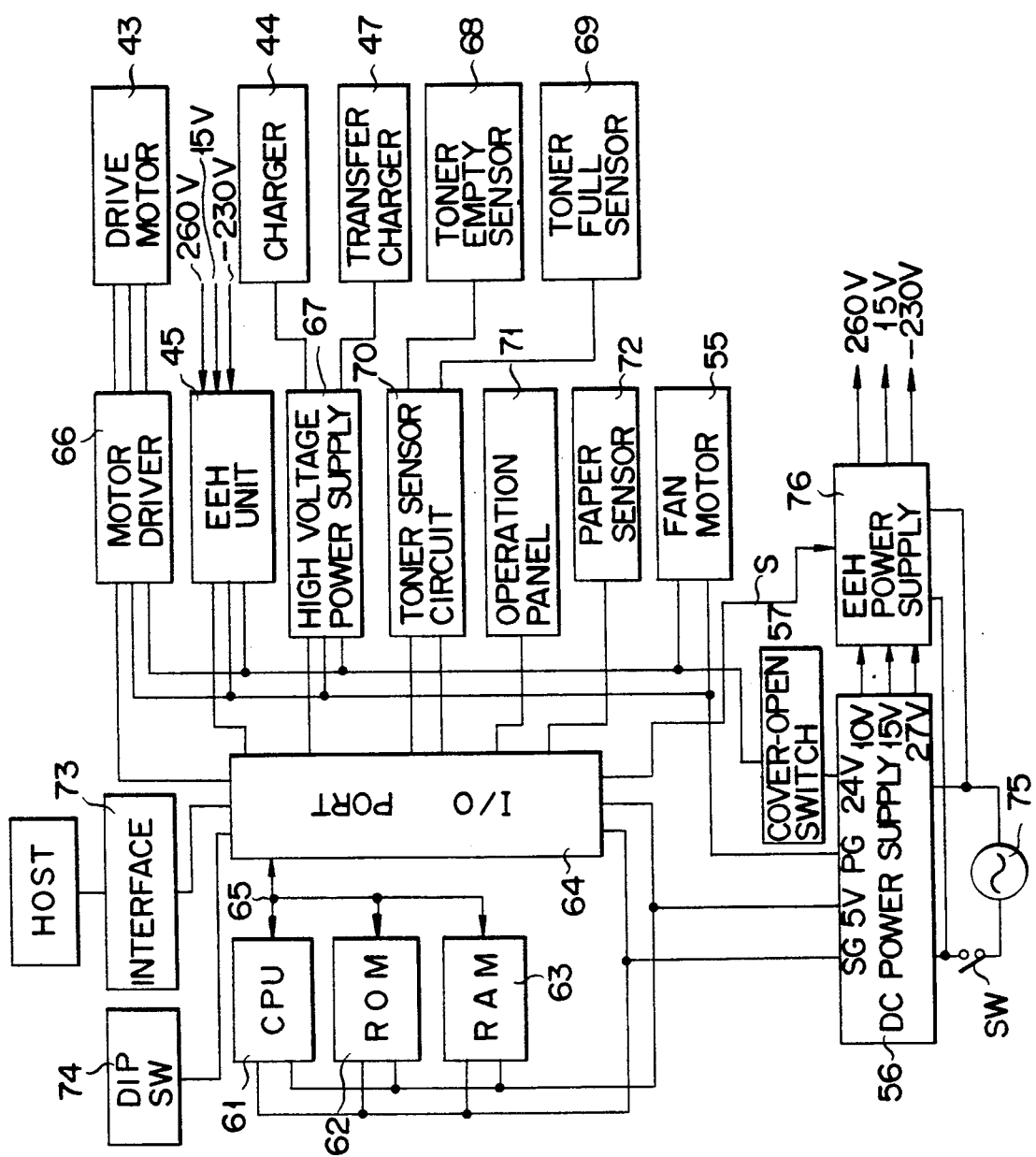
FIG. 2 is a block diagram showing a circuit arrangement of the printer shown in FIG. 1.

FIG. 2 is a block diagram showing a circuit arrangement. In FIG. 2, reference numeral 61 denotes a microprocessor (CPU) constituting a control unit main body; 62, a ROM (read-only memory) for storing program data used by CPU 61 to control respective units; 63, a RAM (random-access memory) for storing image information, and various processing data sent from an external host computer; and 64, an I/O port. These components are connected through bus line 65.

I/O port 64 is connected to motor driver 66 for controlling drive motor 43, high voltage power supply 67 for supplying a high voltage to EEH unit 45, charger 44, and transfer charger 47, toner sensor circuit 70 for receiving signals from toner empty sensor 68 and toner full sensor 69 arranged in developer 46, operation panel 71 serving as an operation unit provided with key switches, indicators, and the like, paper sensor 72 for detecting conveyed paper sheet P, fan motor 55, interface 73 for receiving image information from the host computer, and dip switch 74.

DC power supply 56 is connected to commercial AC power supply 75 to generate a voltage of 5 V between a 5-V terminal and an SG (ground) terminal, and to generate a voltage of 24 V between a 24-V terminal and a PG (ground) terminal. Cover-open switch 57 is inserted in a line connected to the 24-V terminal.

The voltage of 5 V from DC power supply 56 is supplied to CPU 61, ROM 62, RAM 63, and I/O port 64, and the voltage of 24 V is supplied to motor driver 66, EEH unit 45, high voltage power supply 67, and fan motor 55.

Commercial AC power supply 75 is connected to EEH power supply 76. DC power supply 56 generates voltages of 10 V, 15 V, and 27 V, and supplies them to EEH power supply 76.

EEH power supply 76 supplies DC voltages of 260 V, 15 V, and −230 V to EEH unit 45.

Figure 3:
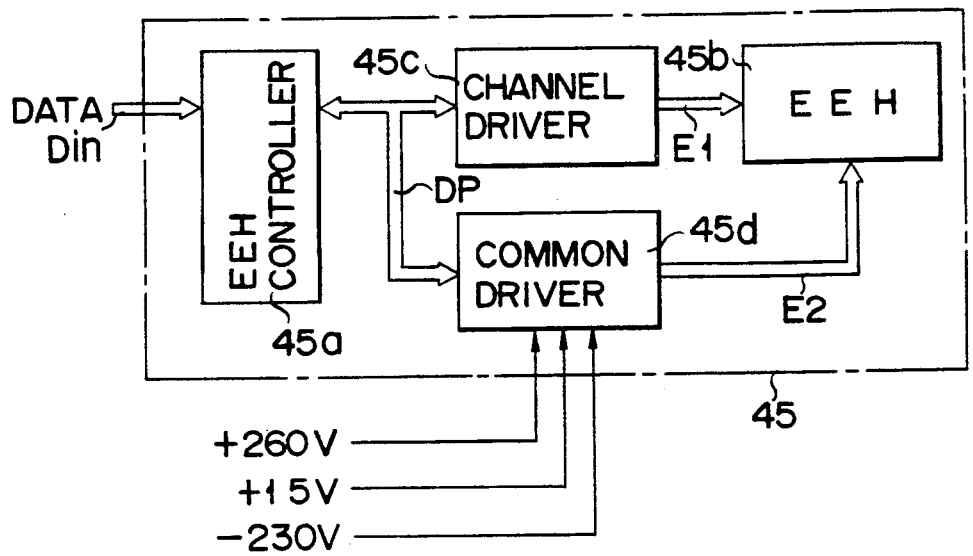
FIG. 3 is a block diagram showing a circuit arrangement of an EEH unit in FIG. 2.
Figure 4:
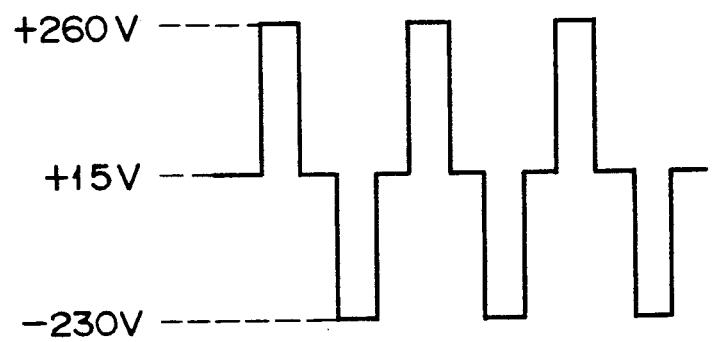
FIG. 4 is a waveform chart showing a waveform of a high AC voltage supplied to the EEH unit in FIG. 3.

As shown in FIG. 3, EEH unit 45 comprises EEH controller 45a for converting externally input data Din into printing data DP, channel driver 45c for applying rectangular wave voltage signal E1 having a voltage amplitude of +28 V to channel electrodes of edge emitter array head (EEH) 45b on the basis of data DP from EEH controller 45a, and common driver 45d. Common driver 45d receives data DP from EEH controller 45a, and DC voltages of 260 V, 15 V, and −230 V from EEH power supply 76, and applies, to common electrodes of EEH 45b, AC voltage signal pulse E2 which is periodically changed from, for example, +260 V→+15 V→−230 V→+15 V→+260 V, as shown in FIG. 4.

Figure 5:
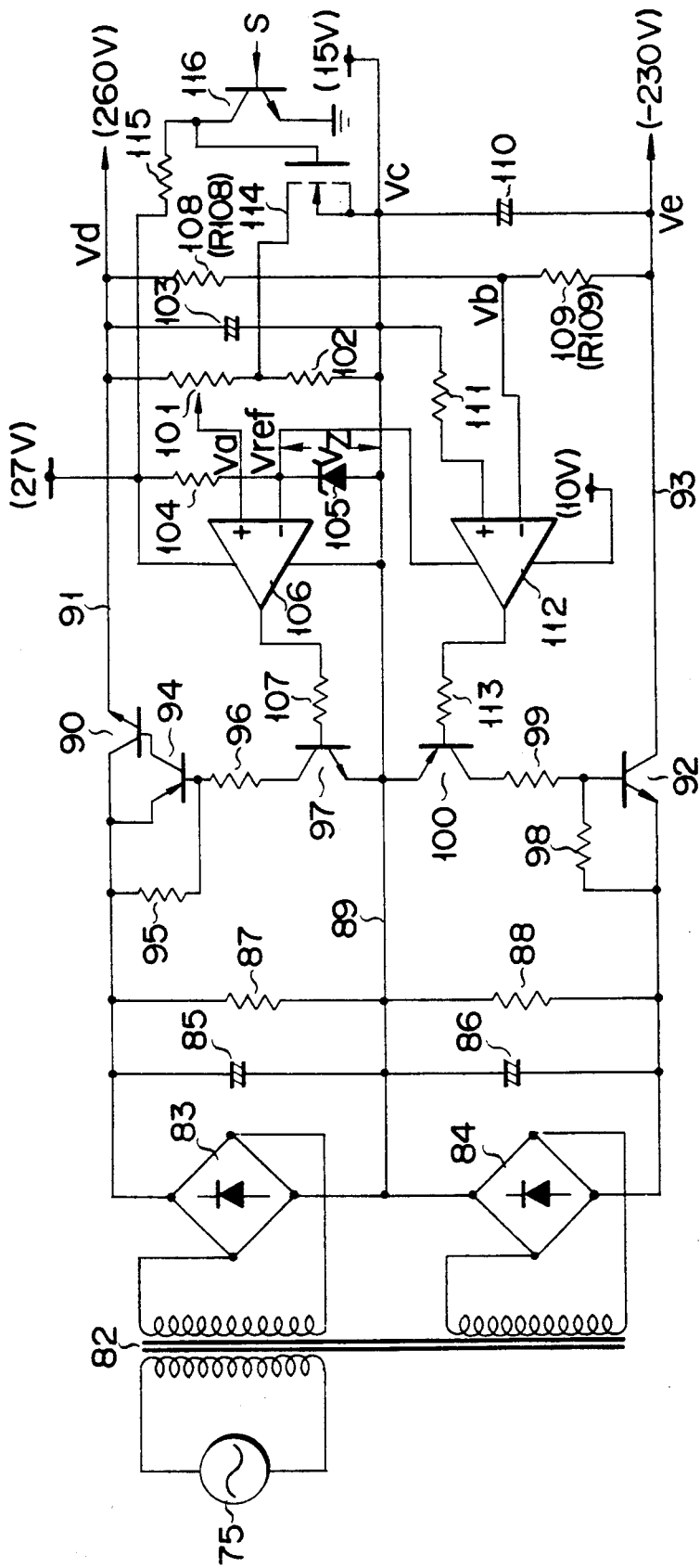
FIG. 5 is a circuit diagram showing an EEH power supply shown in FIG. 2.

EEH power supply 76 shown in FIG. 2 is a power supply as principal part of the present invention, and is arranged, as shown in FIG. 5. More specifically, first and second full-wave rectifiers 83 and 84 are connected to AC power supply 75 via power supply transformer 82. Filter capacitors 85 and 86 are respectively connected to the DC output terminals of full-wave rectifiers 83 and 84, thus constituting a voltage output circuit. Resistors 87 and 88 are connected in parallel with filter capacitors 85 and 86, respectively.

The negative output terminal of first full-wave rectifier 83 is connected to the positive output terminal of second full-wave rectifier 84, and the node is applied with central potential Vc of 15 V from DC power supply 56 via line 89.

The collector of NPN transistor 90 is connected to the positive output terminal of first full-wave rectifier 83, and the emitter of transistor 90 is connected to 260-V output line 91.

The emitter of NPN transistor 92 is connected to the negative output terminal of second full-wave rectifier 84, and the collector of transistor 92 is connected to −230-V output line 93.

The collector and the base of transistor 90 are connected to the emitter and the collector of PNP transistor 94. Resistor 95 is connected between the emitter and the base of transistor 94. The base of transistor 94 is connected to line 89 via resistor 96, and the collector and the emitter of NPN transistor 97.

Resistor 98 is connected between the base and the emitter of transistor 92. The base of transistor 92 is connected to line 89 via resistor 99 and the collector and the emitter of PNP transistor 100.

Transistors 90, 94, and 97, and resistors 95 and 96 form a first voltage adjusting circuit, and transistors 92 and 100, and resistors 98 and 99 form a second voltage adjusting circuit.

A voltage detector comprising a series circuit of variable resistor 101 and resistor 102, and capacitor 103 are connected between output line 91 and line 89. A series circuit of resistor 104 and Zener diode 105 for generating reference potential Vref is connected between the 27-V power supply terminal and line 89 (if a voltage generated by diode 105 is represented by Vz, Vref=Vc+Vz).

The movable terminal of variable resistor 101 is connected to the noninverting input terminal (+) of first comparator 106, and the node between resistor 104 and Zener diode 105 is connected to the inverting input terminal (−) of first comparator 106. A power supply circuit of first comparator 106 is connected between the 27-V power supply terminal and line 89. The output terminal of first comparator 106 is connected to the base of transistor 97 via resistor 107.

A voltage divider comprising a series circuit of two resistors 108 and 109 having the same resistance is connected between output lines 91 and 93. Capacitor 110 is connected between line 89 and output line 93.

Line 89 for obtaining central potential Vc is connected to the noninverting input terminal (+) of second comparator 112 via resistor 111, and the node between resistors 108 and 109 of the voltage divider is connected to the inverting input terminal (−) of second comparator 112. A power supply circuit of second comparator 112 is connected between the node between resistor 104 and Zener diode 105 and the 10-V power supply terminal. The output terminal of second comparator 112 is connected to the base of transistor 100 via resistor 113.

Resistor 102 is connected in parallel with MOS FET (field effect transistor) 114. NPN transistor 116 is connected between the 27-V power supply terminal and a ground terminal via resistor 115. The gate of FET 114 is connected to the collector of transistor 116. MOS FET 114 and transistor 116 constitute a level changing means.

The base of transistor 116 receives control signal S from I/O port 64 in FIG. 2. Control signal S is normally a high-level signal. When housing 41 is opened, cover-open switch 57 in FIG. 1 is turned off, and control signal S becomes a low-level signal.

In this embodiment with the above arrangement, when switch SW in FIG. 2 is turned on to turn on the power supply, voltages of 5 V and 24 V are output from DC power supply 56, and are supplied to the respective sections, and voltages of 10 V, 15 V, and 27 V are supplied to EEH power supply 76.

When high-level control signal S is supplied from I/O port 64 to the base of transistor 116, transistor 116 is enabled, and FET 114 is disabled.

In this state, in EEH power supply 76, an AC voltage from transformer 82 is full-wave rectified by full-wave rectifiers 83 and 84, and the rectified voltages are then filtered by filter capacitors 85 and 86, thereby generating DC voltages slightly higher than 245 V across the two terminals of capacitors 85 and 86, respectively.

First comparator 106 compares detection potential Va input from the movable terminal of variable resistor 101 with reference potential Vref input from Zener diode 105, and controls the base current of transistor 97 so that a difference between Vref and Va becomes zero. Thus, the emitter currents of transistors 94 and 90 are controlled, and a potential difference between output line 91 and line 89 is held just at 245 V. Since a voltage of 15 V is applied from DC power supply 56 to line 89, potential Vd of output line 91 is held at a constant value of 260 V.

Second comparator 112 compares detection voltage Vb from the node between resistors 108 and 109 (R108=R109) of the voltage divider with the central potential of 15 V as reference voltage Vc, and controls the base current of transistor 100, so that a difference between Vc and Vb becomes zero. Thus, the collector current of transistor 92 is controlled, and a potential difference between line 89 and output line 93 is held just at 245 V. Therefore, potential Ve of output line 93 is held at a constant value of −230 V (=15 V−245 V).

When potential Vd of output line 91 is determined to be 260 V in this manner, potential Ve of output line 93 is automatically determined to be −230 V. Therefore, potentials of 260 V and −230 V can be easily obtained by only adjusting variable resistor 101. More specifically, an adjusting operation can be facilitated.

Since central potential Vc=15 V is determined as a fundamental voltage for generating a reference voltage to be input to first and second comparators 106 and 112, when the central potential is changed, potentials Vd and Ve of output lines 91 and 93 can be changed in the same manner as the central potential. Therefore, positive and negative potentials Vd and Ve can be simultaneously changed.

In this manner, voltages of 260 V, 15 V, and −230 V are supplied from EEH power supply 76 to common driver 45d of EEH unit 45. Common driver 45d supplies an AC voltage signal pulse which is periodically changed from, for example, +260 V→+15 V→−230 V→+15 V→+260 V, to the common electrodes of the EL elements of EEH 45b. In this manner, EEH unit 45 is ready to perform an exposure operation.

When the EL printer starts its operation, the photosensitive body of photosensitive drum 42 is uniformly charged by charger 44, and is then exposed by a light-emitting operation of EEH 45b of EEH unit 45, so that image information is recorded thereon as an electrostatic latent image. The electrostatic latent image is developed with a toner by developer 46, and the toner image is transferred by transfer charger 47 onto a paper sheet fed from paper feed cassette 51. Thereafter, the paper sheet is exhausted through fixing device 53 and exhaust rollers 54A and 54B. Any residual toner is removed by cleaning device 49 from the photosensitive body after the transfer operation. The photosensitive body is then discharged by discharging device 50 to prepare for the next charging operation.

In this manner, a printing operation for one paper sheet is performed, and this operation is repeated for performing printing operations for a plurality of paper sheets.

When housing 41 is opened, control signal S to be supplied from I/O port 64 to EEH power supply 76 goes to low level. Thus, transistor 116 is disabled, and FET 114 is enabled. The level of detection potential Va input from variable resistor 101 to first comparator 106 is decreased to be lower than the level of reference potential Vref input from Zener diode 105. Thus, the output level from first comparator 106 becomes low level, so that transistor 97 is disabled, and transistors 90 and 94 are disabled. Then, positive voltage output line 91 is disconnected from the positive terminal of filter capacitor 85.

When line 91 is disconnected from capacitor 85, the level of divided potential Vb from the node between resistors 108 and 109 is decreased to be lower than the level (15 V) of the central potential. Therefore, since the output level from second comparator 112 becomes high level, transistor 100 is disabled, and transistor 92 is disabled. In this manner, negative voltage output line 93 is disconnected from the negative terminal of filter capacitor 86, and an output of −230 V is also lowered. In this manner, potentials Vd and Ve of lines 91 and 93 are finally lowered to the central potential of 15 V (i.e., power supply output is stopped).

In this manner, voltage outputs of 260 V and −230 V can be easily stopped by control signal S without cutting off a power supply from AC power supply 75 to the printer.

Figure 6:
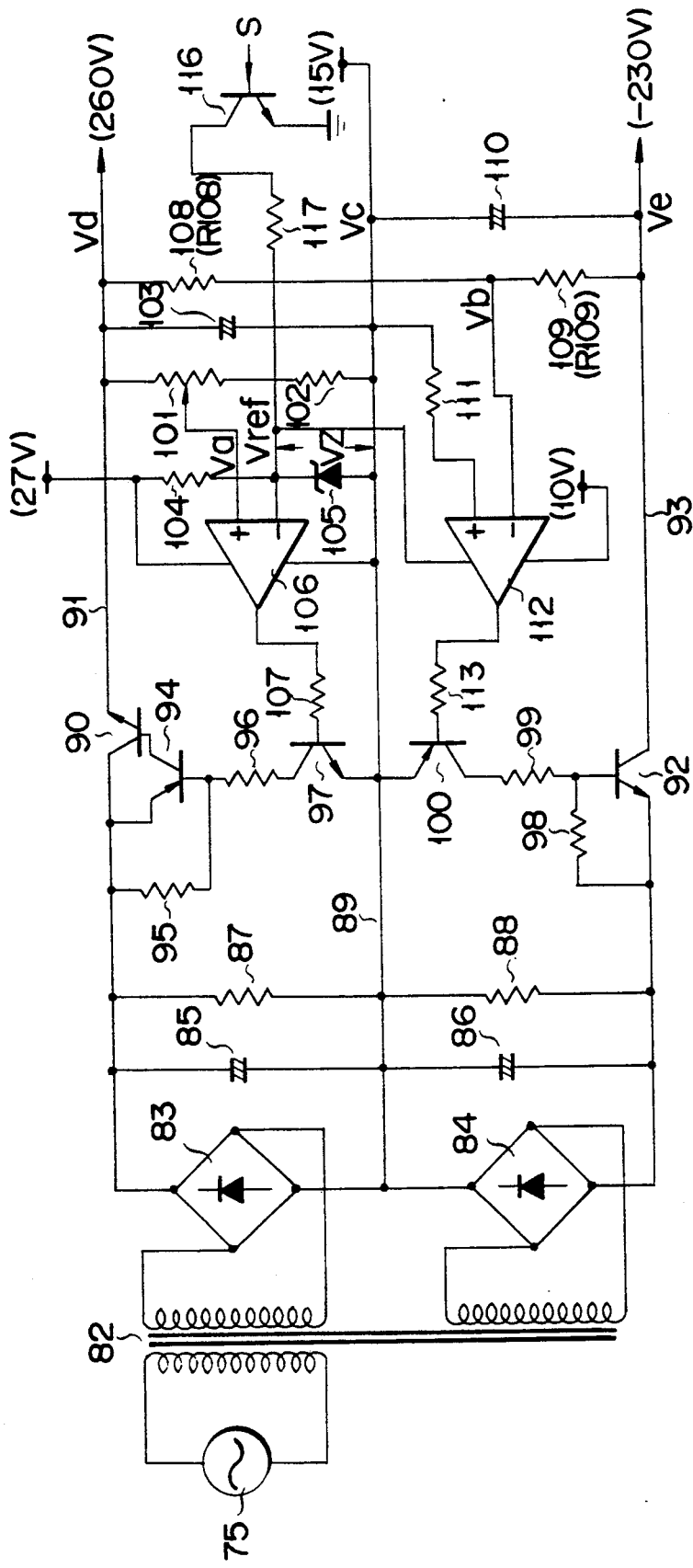
FIG. 6 is a circuit diagram showing a modification of the circuit shown in FIG. 5.

FIG. 6 shows a modification of EEH power supply 76 shown in FIG. 5. FIGS. 5 and 6 illustrate substantially the same circuit arrangements of the power supply regulators except for an arrangement for stopping voltage outputs.

In FIG. 5, transistor 116 is enabled, and transistor 114 is disabled in response to high-level signal S, and detection potential Va is increased to satisfy Va>Vref, thereby decreasing voltages +Vd and −Ve.

On the other hand, in FIG. 6, transistor 116 is enabled in response to high-level signal S, and reference potential Vref is decreased to be lower than Vc+Vz and to satisfy Va>Vref, thereby decreasing voltages +Vd and −Ve.

In the circuit arrangements in FIGS. 5 and 6, when the absolute value of positive high voltage Vd (260 V −15 V=245 V) based on central potential Vc, and the absolute value of negative high voltage Ve (−230 V−15 V=−245 V) based on central potential Vc are set to be equal to each other, resistances R108 and R109 of resistors 108 and 109 are set to be equal to each other. When the absolute value of positive high voltage Vd is set to be different from that of negative high voltage Ve (−230 V −15 V= −245 V), resistance R108 can be set to be different from resistance R109. For example, with reference to central potential Vc, if R108=R109, |Vd|=|Ve|, but if R108=R109, |Vd|=n|Ve|.

In this embodiment, the present invention is applied to a power supply for driving a common driver of a line head having an array of EL elements, which is used as an exposure device in an EL printer. However, the present invention is not limited to this.

As described above, according to the present invention, a power supply device which can easily stop positive and negative relatively high voltage outputs under external control, and which has a simple circuit arrangement for attaining such control can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A power supply device comprising:
first output means for outputting a power supply voltage of a first potential;
second output means for outputting a power supply voltage of a second potential;
means for connecting said first and second output means;
means for applying a predetermined central potential to said connecting means;
reference potential means for generating a reference potential having a predetermined potential difference from the central potential;
first detection potential means for generating a first detection potential corresponding to the first potential;
second detection potential means for generating a second detection potential corresponding to both the first potential and the second potential;
first control means for controlling said first output means to minimize a potential difference between the first detection potential and the reference potential;
second control means for controlling said second output means to minimize a potential difference between the second detection potential and the central potential; and
means for forcibly changing at least one of the first detection potential and the reference potential using a predetermined control signal, so that both the first potential and the second potential change toward the central potential.

2. A device according to claim 1, assembled in an electronic copying machine including a first section to which positive and negative high power supply potentials are applied and a second section to which other power supply potentials are applied, wherein said first and second output means apply power supply potentials to the first section, and wherein:
said device further comprises:
means for generating the control signal when a cover of the electronic copying machine is opened; and
means for attenuating only the positive and negative power supply potentials applied to the first section at the same rate toward the central potential in response to the generated control signal without stopping applying of power supply potentials to the second section.

3. A device according to claim 1, wherein:
the first potential is a given predetermined positive potential, and the second potential is a given predetermined negative potential different in magnitude from the first potential; and
said second detection potential means generates the second detection potential having a potential at the center of the first potential and the second potential, so that an absolute value of a potential difference between the first potential and the central potential becomes substantially equal to an absolute value of a potential difference between the second potential and the central potential, for said given predetermined first and second potentials.

4. A power supply device comprising:
a voltage output circuit for outputting positive and negative voltages with respect to a predetermined preset voltage serving as a central voltage;
a first voltage adjusting circuit inserted in a positive voltage output line from said voltage output circuit;
a first comparator, connected between an output terminal of said first voltage adjusting circuit and a central voltage line, for comparing a detection voltage from a voltage detection circuit with a reference voltage generated based on the central voltage, for controlling said first voltage adjusting circuit, so that an output voltage from said first voltage adjusting circuit becomes a positive voltage having a predetermined level difference from the central voltage, and for, when the detection voltage level is decreased to be lower than the reference voltage level, controlling said first voltage adjusting circuit to cut off the positive voltage output line;

means, responsive to an external signal, for forcibly decreasing the detection voltage level from the voltage detection circuit to be lower than the reference voltage level;

a second voltage adjusting circuit inserted in a negative voltage output line from said voltage output circuit;

a voltage divider, connected between output terminals of said first and second voltage adjusting circuits, for dividing a voltage across the output terminals to a half divided voltage; and a second comparator for comparing the divided voltage from said voltage divider with the central voltage as a reference voltage, for controlling said second voltage adjusting circuit, so that an output voltage from said second voltage adjusting circuit becomes a negative voltage having the same predetermined level difference as the positive voltage from the central voltage, and for, when the divided voltage level is decreased to be lower than the central voltage level, controlling said second voltage adjusting circuit to cut off the negative voltage output line.

* * * * *